United States Patent [19]

Kuroda

[11] Patent Number: 5,376,947
[45] Date of Patent: Dec. 27, 1994

[54] TOUCH-TYPE INPUT TERMINAL APPARATUS FOR POINTING OR SPECIFYING POSITION ON DISPLAY DEVICE

[75] Inventor: Kazuo Kuroda, Tokorozawa, Japan

[73] Assignee: Pioneer Electronic Corporation, Tokyo, Japan

[21] Appl. No.: 956,970

[22] Filed: Oct. 6, 1992

[30] Foreign Application Priority Data

Mar. 9, 1992 [JP] Japan .................................. 4-50886

[51] Int. Cl.⁵ .............................................. G09G 5/08
[52] U.S. Cl. .................................................. 345/173
[58] Field of Search ....................... 340/706, 709, 712; 178/18, 19; 345/173–178, 104, 179

[56] References Cited

U.S. PATENT DOCUMENTS 4,903,012 2/1990 Ohuchi ................................ 340/712

Primary Examiner—Jeffery Brier
Attorney, Agent, or Firm—Sughrue, Mion, Zinn, Macpeak & Seas

[57] ABSTRACT

An input terminal apparatus for inputting, to a display device which has a screen and displays input information on the screen, positional information indicating a position of the input information displayed on the screen, is provided with: a touch sensor device including a sensor area having sensing points which number is less than the number of pixels of the screen, for detecting a touch condition on the sensor area per each of the sensing points; and a detection result outputting device, which is coupled to the touch sensor device, for sampling the detected touch condition periodically at a predetermined time interval and outputting detection data indicating the detected and sampled touch condition as a detection result. The input terminal apparatus is also provided with: a memory device for storing the detection data outputted from the detection result outputting device; and a calculating device for calculating a vector quantity of a moving amount on the screen corresponding to a moving amount of the position touched on the sensor area, on the basis of the detection data stored in the memory device, and outputting movement data indicating the calculated vector quantity to the display device.

9 Claims, 4 Drawing Sheets

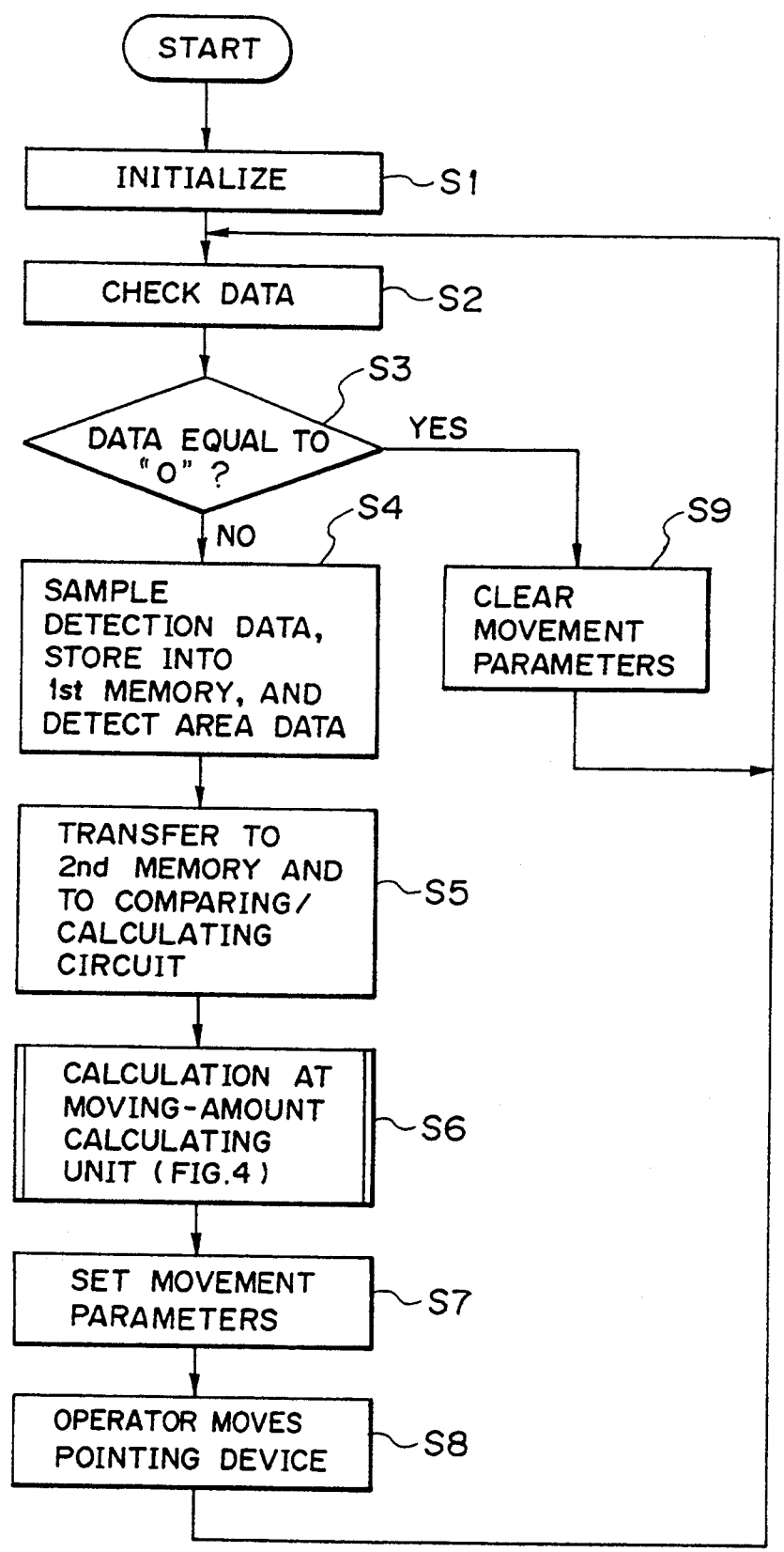

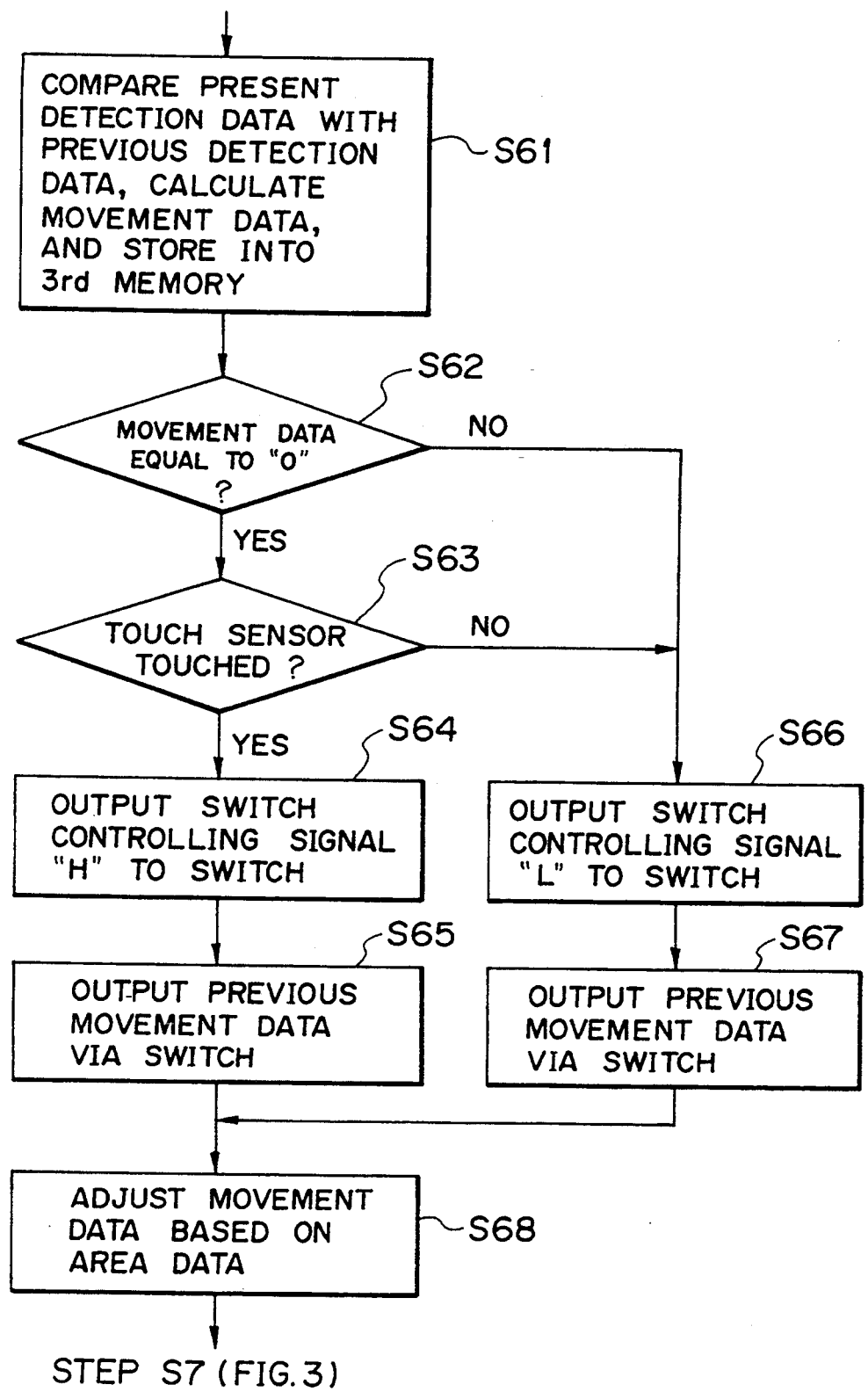

TOUCH-TYPE INPUT TERMINAL APPARATUS FOR POINTING OR SPECIFYING POSITION ON DISPLAY DEVICE

BACKGROUND OF THE INVENTION

1. Field of the Invention

The present invention generally relates to an input terminal apparatus, and more particularly to an input terminal apparatus to point or specify a position on displayed information on a display device.

2. Description of the Related Art

As this kind of input terminal apparatus, there are various pointing devices such as a mouse device, a tablet device, and so on.

The mouse device is provided with a track ball or a pair of movable wheels, which is manually rotated by hand on a predetermined plane, so that the position corresponding to the rotation amount can be specified to be inputted on the display.

The tablet device is provided with a screen which is provided with a plurality of sensors arranged in a matrix on a plane, such that the number of the sensors is equal to that of the pixels of the screen. On the screen, an exclusive input pen is contacted to an arbitrary position by an operator, so that the positional data of thus contacted position, can be inputted as input data indicating coordinate values of the contacted position.

In this manner, an arbitrary position of the display screen can be positioned or specified to be inputted by use of these pointing devices.

However, in these pointing devices, when the moving amount on the display screen is large, it becomes necessary to move the mouse device or the tablet device by a large amount corresponding to this large moving amount to specify the position. Namely, in the case that the moving amount on the display is large, the moving amount of the mouse device becomes quite large, or the area of the sensor plane of the tablet device becomes quite large, resulting in an increase of the cost and difficulty in the input operation.

SUMMARY OF THE INVENTION

It is therefore an object of the present invention to provide an input terminal apparatus, by which a position on the screen can be specified to be inputted with a relatively small moving amount with respect to the moving amount required on the screen.

The above object of the present invention can be achieved by an input terminal apparatus for inputting, to a display device which has a screen and displays input information on the screen, positional information indicating a position of the input information displayed on the screen. The input terminal apparatus is provided with: a touch sensor device including a sensor area having sensing points which number is less than the number of pixels of the screen, for detecting a touch condition on the sensor area per each of the sensing points; and a detection result outputting device, which is coupled to the touch sensor device, for sampling the detected touch condition periodically at a predetermined time interval and outputting detection data indicating the detected and sampled touch condition as a detection result. The input terminal apparatus is also provided with: a memory device for storing the detection data outputted from the detection result outputting device; and a calculating device for calculating a vector quantity of a moving amount on the screen corresponding to a moving amount of the position touched on the sensor area, on the basis of the detection data stored in the memory device, and outputting movement data indicating the calculated vector quantity to the display device.

In the input terminal apparatus of the present invention, the touch condition of the sensor area, on which an arbitrary point is touched by an operator depending on the position of the information displayed on the screen of the display device, is detected by the touch sensor device. Then, the touched condition is periodically detected by the detection result outputting device, and the calculating device calculates the vector quantity based on the detection data of the detection result outputting device. Accordingly, the sensor area of the touch sensor device can be made small regardless of the size of the screen of the display device. That is to say, it is allowed to specify the display position on a large screen of the display device by use of a small sensor area. By an input operation with a small moving amount on such a small area of the touch sensor device, a large moving amount on the large screen can be covered, and that, by an input operation with a delicate motion of the finger on the sensor area, any display position on the screen can be precisely specified.

In this manner, since the display position can be specified without adapting the size of the touch sensor device to the size of the screen, the sensor area of the touch sensor device can be manufactured to be small, to realize a low cost and a high precision of the inputting operation.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 3 is a flow chart of an operation of the input terminal apparatus of FIG. 1; and FIG. 4 is a flow chart of a calculation operation at a moving-amount calculating unit (step S6) in the operation shown in FIG. 3.

DETAILED DESCRIPTION OF THE PREFERRED EMBODIMENTS

Referring to the accompanying drawings, an embodiment of the present invention will be now explained.

Figure 1:
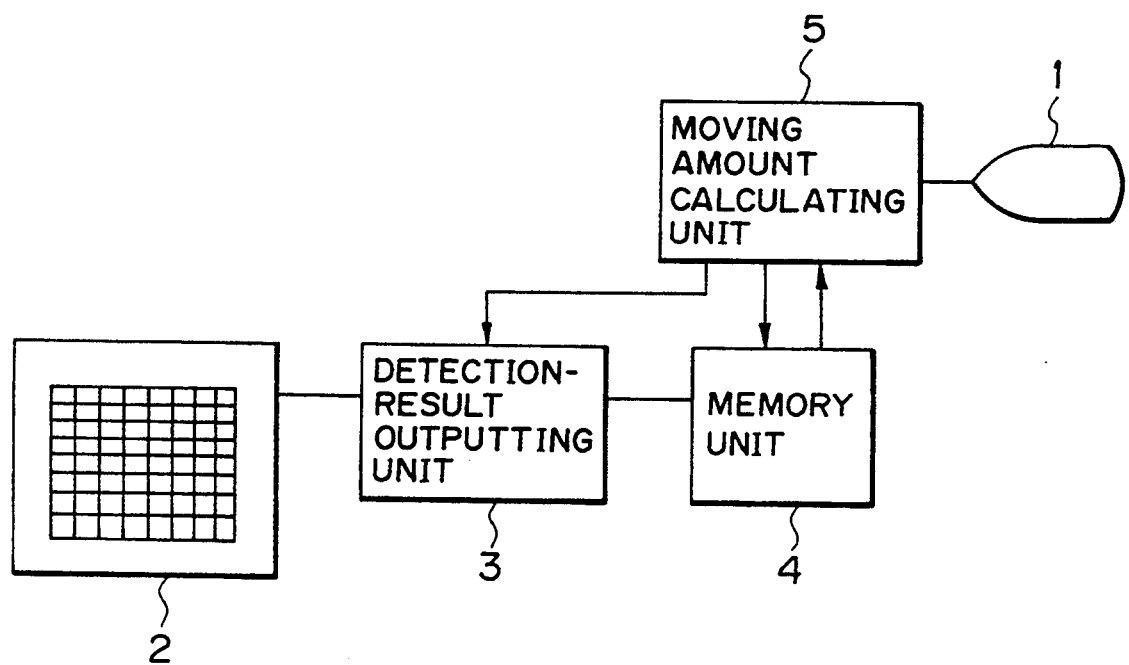
FIG. 1 is a block diagram of an input terminal apparatus as one embodiment of the present invention.

In FIG. 1, an input terminal apparatus as one embodiment of the present invention, is provided with a display unit 1, a touch sensor unit 2, a detection result outputting unit 3, a memory unit 4, and a moving-amount calculating unit 5.

The display unit 1 includes a screen, and is adapted to display information inputted from the calculating unit 5, on the screen. The display unit 1 may consist of, for example, a CRT (Cathode Ray Tube) display device, a LCD (Liquid Crystal Display) device, an EL (Electroluminescence) display device, and so on. The touch sensor unit 2 is provided with a touch sensor having a sensor area including sensing points which number is less than that of the pixels of the screen of the display unit 1. The touch sensor unit 2 is adapted to detect the touch or pressure-applied condition of the sensor area on the touch sensor, when the operator touches one portion of the sensor area by his finger. The touch sensor unit 2 may consist of, for example, a touch sensor for sensing the change in applied pressure at each sensing point, a touch sensor for sensing the change in electrical potential at each sensing point, a touch sensor for sensing the change in capacity or distance of a pair of electrodes at each sensing point, and so on.

The detection result outputting unit 3 is adapted to output the touch condition of the touch sensor unit 2 as detection result data periodically every determined time period. The memory unit 4 is adapted to store the detection result data outputted from the detection result outputting unit 3. The calculating unit 5 is adapted to calculate the vector quantity of movement on the screen of the display unit 1, on the basis of the detection result data stored in the memory unit 4.

Figure 2:
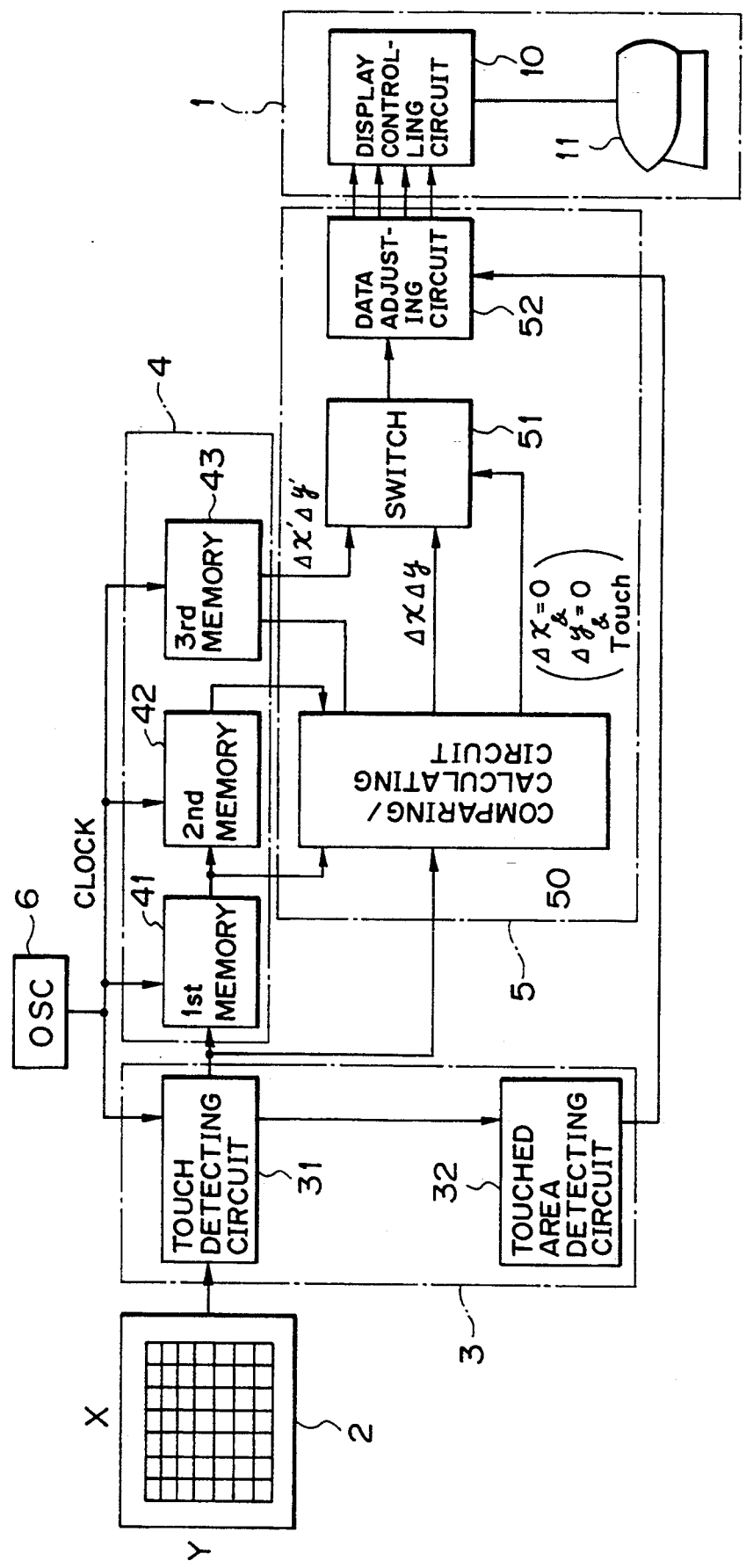
FIG. 2 is a detailed block diagram of the input terminal apparatus of FIG. 1.

The detailed construction of the present embodiment is shown in FIG. 2.

In FIG. 2, the touch sensor unit 2 is provided with the touch sensor having the sensor area, on which the matrix line drawing is formed so as to specify the addresses on the XY coordinates.

The detection result outputting unit 3 includes a touch detecting circuit 31 and a touched area detecting circuit 32. The touch detecting circuit 31 is adapted to sample the detection data continuously outputted from the touch sensor unit 2 every time when a sampling clock is inputted from a clock oscillator (OSC) 6. The touched area detecting circuit 32 is adapted to detect the touched area i.e. the pressure applied contact area with respect to the touch sensor unit 2 by the operator, according to the detection data which is sampled by the touch detecting circuit 31, and then output thus detected touched area data.

The memory unit 4 includes: a first memory 41, which stores the detection data outputted from the touch detecting circuit 31 on the basis of the sampling pulse of the clock oscillator 6; a second memory 42, which stores the detection data transferred at the timing of the next sampling pulse from the first memory 41; and a third memory 43, which stores the movement data related to the vector quantity calculated by the calculating unit 5.

The calculating unit 5 includes a comparing/calculating circuit 50, a switch 51, and a data adjusting circuit 52. The comparing/calculating circuit 50 compares the detection data of the present cycle and the detection data of the previous cycle read from the memories 41 and 42, respectively, to output the vector quantity of moving amount per unit time as for the x and y directions, as the movement data. The switch 51 is adapted to switch to output either the movement data of the present cycle outputted from the comparing/calculating circuit 50, or the movement data of the previous cycle outputted from the third memory 43. The data adjusting circuit 52 is adapted to adjust the movement data outputted via the switch 51 on the basis of the area data from the touched area detecting circuit 32, and then output thus adjusted data to a display controlling circuit 10 equipped in the display unit 1. The display controlling unit 10 controls a CRT 11 equipped in the display unit 1, according to the adjusted data inputted from the data adjusting circuit 52, so that the displaying and point-specifying operations are enabled on the CRT 11, in the manner described below.

The calculating unit 5 may be adapted to calculate a direction of the vector quantity i.e. the movement data by comparing two consecutive detection data successively sampled by the detection result outputting unit 3, and calculate an absolute value of the vector quantity by use of the detection data which follows the two consecutive detection data. Alternatively, the calculating unit 5 may be adapted to calculate the absolute value of the vector quantity on the basis of the touched area detected by the touched area detecting circuit 32.

The input operation of the present embodiment, will be explained hereinbelow, with referring to flow charts of FIGS. 3 and 4.

In FIG. 3, at first, upon starting the input operation, the initialization is performed with respect to each unit and component of the input terminal apparatus (step S1), and the data is inputted to the input terminal apparatus by the operation at the touch sensor unit 2 by the operator.

Then, the detection data in each of the touch detecting circuit 31, the first memory 41 and the second memory 42, and the movement data in each of the calculating unit 5 and the third memory 43, are checked (step S2), and it is Judged whether or not all of thus checked data are "o" (step S3).

If it is Judged that all of the checked data are not "o" at the step S3 (NO), the touch detecting circuit 31 samples the detection data detected by the touch sensor unit 2 at every sampling clock, so that the sampled detection data is stored into the first memory 41 and outputted to the comparing/calculating circuit 50, while the area data is detected by the touched area detecting circuit 32 (step S4).

Then, the detection data stored in the first memory 41, is read out at the timing of the next sampling pulse, to be transferred and stored into the second memory 42, and to be also transferred to the comparing/calculating circuit 50 (step S5). Based on thus transferred data, the calculating unit 5 performs the calculation of the movement data for the input position on the display unit 1 (step S6), which includes the steps S61 to S68 shown in the flow chart of FIG. 4, in the following manner.

Namely, in FIG. 4, the comparing/calculating circuit 50 compares the present detection data outputted from the touch detecting circuit 31, with the previous detection data stored in the first memory 41. Based on the compared data, the comparing/calculating circuit 50 calculates the vector quantity per unit time prescribed by the sampling pulse as for the input position movement, as the movement data $\Delta x1$, $\Delta y1$, and stores this calculated movement data into the third memory 43 (step S61).

The comparing/calculating unit 50 judges whether or not each calculated movement data $\Delta x$, $\Delta y$ is "o" (step S62). If it is Judged that the movement data $\Delta x = 0$ and $\Delta y = o$ (YES), and that the sensor of the touch sensor unit 2 is touched by the fingers of the operator (step S63), i.e. if the operator's finger moves from one arbitrary point A to another arbitrary point B and stops at the point B, the comparing/calculating circuit 50 outputs a "H" switch controlling signal to the switch 51. In other cases at the steps S62 and S63 (NO), the flow branches to the step S66, and the comparing/calculating circuit 50 outputs a "L" switch controlling signal to the switch 51 (step S66).

The movement data $\Delta x1$, $\Delta y1$ are stored into the third memory 43 in synchronization with the sampling pulse (step S61). The comparing/calculating circuit 50 calculates the next movement data Δx2, Δy2 since the detection data is inputted thereto one after another from the touch detecting circuit 31, and outputs to the third memory 43 and the switch 51, respectively. The third memory 43 outputs the previously stored movement data Δx1, Δy1, which become the previous movement data Δx', Δy' in synchronization with the next sampling pulse, to the switch 51, and at the same time, stores the movement data Δx2, Δy2 which are the present movement data Δx, Δy. To the switch 51, the previous movement data Δx1, Δy1 are inputted from the third memory 43, while the present movement data Δx2, Δy2 are inputted from the calculating circuit 5. The switch 51 outputs either one of thus inputted movement data depending on the switch controlling signal outputted from the comparing/calculating circuit 50.

Namely, when the switch controlling signal is "H", the switch 52 is switched to the side of the third memory 43, and outputs the previous movement data Δx1, Δy1 to the data adjusting circuit 52 (step S65). Alternatively, when the switch controlling signal is "L", the switch 51 is switched to the side of the comparing/calculating circuit 50, and outputs the present movement data Δx2, Δy2 to the data adjusting circuit 52 (step S67).

When the previous movement data Δx1, Δy1 or the present movement data Δx2, Δy2 are inputted to the data adjusting circuit 52, the data adjusting circuit 52 adjusts the gain of the inputted movement data Δx1, Δy1 or Δx2, Δy2, according to the area data detected by the touched area detecting circuit 32 (step S68). For example, if the sensor area, such as a surface of a touch panel, of the touch sensor unit 2 is pressed with a high pressure, the pressure applied area increases. Thus, the adjustment is performed so as to compensate such an increase of the pressure applied area due to the applied pressure on the basis of increasing ratio $\alpha$, such that the movement data Δx, Δy (the movement data Δx1, Δy1, the movement data Δx2, Δy2) are adjusted to be the movement data $\alpha$Δx, $\alpha$Δy (the movement data $\alpha$Δx1, $\alpha$Δy1, the movement data $\alpha$Δx2, $\alpha$Δy2), respectively.

Then, in FIG. 3 again, the movement data $\alpha$Δx, $\alpha$Δy after this adjustment are supplied to the display unit 1 to set movement parameters (step S7), and an arbitrary position can be specified on the CRT 11, by pointing a finger etc., of the operator on the touch sensor unit 2, under the control of the display control circuit 10, at the display unit 1 (step S8).

At the step S3, if the detection data and the movement data are all judged to be "0" (YES), the movement parameters of the pointing device are cleared at the display unit 1 (step S9). Then, the flow goes back to the step S2, and the above explained steps after the step S2 are repeatedly performed.

As described above in detail, only a small space for the sensor area, such as a surface of a touch panel, is necessary according to the present embodiment, but the large space is not necessary as in the case of the conventional mouse device. Even if a large moving amount is required to specify a point on the screen, the repeating operation of the same movement is not necessary as in the case of the conventional mouse device or the track ball device. Particularly, since the touch sensor is directly touched or pressure-applied by a finger, the input operation can be delicately performed by use of a high sensitivity of the finger. Further, sensing points are not required as many number as the pixels, as in the case of the tablet device, but only minimum number of the sensing points on the specified area enough to distinguish the direction of the vector quantity, are required in the present embodiment.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the leaning and range of equivalency of the claims are therefore intended to be embraced therein.

What is claimed is:

1. An input terminal apparatus for inputting, to a display device which has a screen and displays input information on the screen, positional information indicating a display position of the input information displayed on the screen, said input terminal apparatus comprising:
   a touch sensor means including a sensor area having sensing points which number is less than the number of pixels of said screen, for detecting a touch condition on the sensor area per each of the sensing points, said touch condition comprising at least one of a touch pressure and a total touched area;
   a detection result outputting means, which is coupled to said touch sensor means, for sampling the detected touch condition periodically at a predetermined time interval and outputting detection data indicating the detected and sampled touch condition as a detection result;
   a memory means for storing the detection data outputted from said detection result outputting means; and
   a calculating means for calculating a vector quantity of a movement of said display position on said screen corresponding to a movement of a sensing point touched on said sensor area, by calculating a direction of the vector quantity from a direction of said movement of the touched sensing point, and by calculating an absolute value of the vector quantity from a distance of said movement of the touched sensing point and the sampled touch condition, on the basis of the detection data stored in said memory means, and outputting movement data indicating the calculated vector quantity to said display device.

2. An input terminal apparatus according to claim 1, wherein said calculating means is adapted to calculate the direction of the vector quantity by comparing two consecutive detection data successively sampled by said detection result outputting means, and calculate the absolute value of the vector quantity by use of detection data which follows said two consecutive detection data.

3. An input terminal apparatus according to claim 1, wherein said detection result outputting means comprises a touch detecting means for detecting coordinates of the touched sensing point of said touch sensor means, and a touched area detecting means coupled to said touch detecting means for detecting a touched area on said sensor area in response to an output of said touch detecting means.

4. An input terminal apparatus according to claim 3, wherein said calculating means is adapted to calculate the absolute value of the vector quantity on the basis of the touched area detected by said touched area detecting means.

5. An input terminal apparatus according to claim 3, wherein said calculating means is adapted to adjust the calculated vector quantity on the basis of the touched area detected by said touched area detecting means.

6. An input terminal apparatus according to claim 1, wherein said memory means comprises a plurality of memory devices including a first memory device for storing the present detection data which is detected at the latest, and a second memory device for storing the detection data detected prior to the present detection data.

7. An input terminal apparatus according to claim 1, wherein said memory means comprises a memory for storing the movement data outputted from said calculating means.

8. An input terminal apparatus according to claim 7, wherein said calculating means comprises a switching means for selectively output one of the movement data once stored in said memory, and the movement data Just outputted from said calculating means.

9. An input terminal apparatus according to claim 1, further comprising an oscillator for generating a clock, said detection result outputting means sampling the touch condition in synchronization with the clock.

* * * * *